United States Patent
Liske et al.

(10) Patent No.: US 9,845,158 B2
(45) Date of Patent: Dec. 19, 2017

(54) AIRCRAFT BATTERY CONTAINMENT PODS

(71) Applicant: X Development LLC, Mountain View, CA (US)

(72) Inventors: Kyle A. Liske, Albuquerque, NM (US); Matthew A. Nubbe, Moriarty, NM (US)

(73) Assignee: X Development LLC, Mountain View, CA (US)

( * ) Notice: Subject to any disclaimer, the term of this patent is extended or adjusted under 35 U.S.C. 154(b) by 71 days.

(21) Appl. No.: 14/517,101

(22) Filed: Oct. 17, 2014

(65) Prior Publication Data
US 2016/0107756 A1    Apr. 21, 2016

(51) Int. Cl.
*B64D 27/26* (2006.01)
*B64D 27/24* (2006.01)
*B64C 7/02* (2006.01)

(52) U.S. Cl.
CPC .............. *B64D 27/24* (2013.01); *B64C 7/02* (2013.01); *Y02T 50/44* (2013.01); *Y02T 50/62* (2013.01)

(58) Field of Classification Search
CPC ........ B64D 27/26; B64D 27/24; B64D 37/12; B64D 2041/005; B64C 7/02; B64C 3/34; B64C 3/24; B64C 2201/042; F41F 3/65; B32B 2457/12
USPC ........................................................ 244/54
See application file for complete search history.

(56) References Cited

U.S. PATENT DOCUMENTS

| | | | | |
|---|---|---|---|---|
| 2,393,105 A | * | 1/1946 | Hasselhorn | B64D 1/06 244/137.4 |
| 2,557,962 A | * | 6/1951 | Greene | B64C 39/02 244/118.2 |
| 3,994,836 A | * | 11/1976 | Honer | C08J 9/236 260/DIG. 24 |
| 4,980,696 A | * | 12/1990 | Stone | H01Q 1/424 343/872 |
| 5,344,696 A | * | 9/1994 | Hastings | B32B 7/02 219/529 |
| 6,745,981 B1 | | 6/2004 | Rainer et al. | |
| 7,966,921 B1 | * | 6/2011 | Alday | B64D 1/02 244/137.4 |

(Continued)

FOREIGN PATENT DOCUMENTS

CN     202728184 U     2/2013

OTHER PUBLICATIONS

PCT/US2015/054996—International Search Report, dated Jul. 19, 2016, 12 pages.

(Continued)

*Primary Examiner* — Medhat Badawi
*Assistant Examiner* — Vincente Rodriguez
(74) *Attorney, Agent, or Firm* — Christensen O'Connor Johnson Kindness PLLC

(57) ABSTRACT

A battery containment pod including a body formed of a lightweight material. The body has an aerodynamic exterior shape and an interior cavity formed in the lightweight material, the size and shape of the interior cavity designed to accommodate one or more battery packs. A smooth exterior coating covers the exterior shape of the body, and an attachment structure formed in or on the body allows the body to be coupled to a flight vehicle. Other implementations are disclosed and claimed.

23 Claims, 4 Drawing Sheets

(56) References Cited

U.S. PATENT DOCUMENTS

| | | | |
|---|---|---|---|
| 8,146,865 B2* | 4/2012 | Sanchez-Brunete Ivarez | B64C 3/24 244/123.1 |
| 8,256,715 B2* | 9/2012 | Ballard | B64C 39/024 244/123.1 |
| 8,443,922 B2 | 5/2013 | Borumand et al. | |
| 8,511,613 B2* | 8/2013 | Droney | B64C 7/02 244/137.4 |
| 8,814,081 B2* | 8/2014 | Gagne | B64D 27/00 244/118.2 |
| 2004/0211862 A1 | 10/2004 | Elam | |
| 2007/0023572 A1 | 2/2007 | Muller et al. | |
| 2009/0292407 A1 | 11/2009 | Minelli et al. | |
| 2012/0225331 A1 | 9/2012 | Tartaglia | |
| 2013/0209839 A1 | 8/2013 | Hucker et al. | |
| 2013/0256464 A1 | 10/2013 | Belik et al. | |
| 2013/0299628 A1* | 11/2013 | Ciampa | B64B 1/62 244/30 |

OTHER PUBLICATIONS

Goldhammer, M. et al., "Surface Coatings and Drag Reduction," Aero Quarterly, QTR_01, 13, 6 pages.

Abbott, I. H. et al., "Theory of Wing Sections," Dover Publications, Inc., New York, pp. 112-115.

* cited by examiner

US 9,845,158 B2

AIRCRAFT BATTERY CONTAINMENT PODS

TECHNICAL FIELD

The disclosed implementations relate generally to containment pods and in particular, but not exclusively, to aircraft battery containment pods.

BACKGROUND

Lithium-ion batteries offer advantages as an energy storage unit for flight vehicles: they have high energy density, adequate power density, and they offer good cycle life compared to other high energy density storage types. One large drawback, however, is the fire danger they pose. Due to their high power density, lithium ion cells can burn or explode vigorously if they reach their thermal runaway temperature by shorting, external heating, or some other defect. The presence of oxidizer and fuel inside the battery cell means combustion temperatures are hot and the reaction is difficult to stop once started.

In flight vehicles it is desirable to minimize weight, meaning that fire suppression is difficult because the weight of systems to contain or extinguish a battery fire can be prohibitive. Large quantities of thermal damping material such as water would be required to moderate the temperature of battery cells so they would not go into thermal runaway. A strong pressure vessel would also be needed to contain the heat and gas generated by a fire, but again this would be heavy and significantly detract from the high energy density that makes lithium ion batteries an attractive energy storage method.

In a flight vehicle that must have very low weight and whose structure is very sensitive to damage, if the batteries were contained inside the vehicle structure, the hot and corrosive combustion products would have to be fully contained until they could be ducted outside of the vehicle. Even a small containment vessel failure could cause structural failure and result in a vehicle crash.

BRIEF DESCRIPTION OF THE DRAWINGS

Non-limiting and non-exhaustive implementations of the present invention are described with reference to the following figures, wherein like reference numerals refer to like parts throughout the various views unless otherwise specified.

DETAILED DESCRIPTION OF ILLUSTRATED IMPLEMENTATIONS

Implementations are described of an apparatus and system for aircraft battery containment pods. Specific details are described to provide a thorough understanding of the implementations, but one skilled in the relevant art will recognize, based on the description, that the invention can be practiced without one or more of the described details, or with other methods, components, materials, etc. In some instances, well-known structures, materials, or operations are not shown or described in detail but are nonetheless encompassed within the scope of the invention.

Reference throughout this specification to "one implementation" or "an implementation" means that a described feature, structure, or characteristic can be included in at least one described implementation, so that appearances of "in one implementation" or "in an implementation" do not necessarily all refer to the same implementation. Furthermore, the particular features, structures, or characteristics may be combined in any suitable manner in one or more implementations.

The described implementations are useful in high-altitude, long-endurance flight vehicles that operate over populated areas. It is desirable to design the vehicle so that emergency situations in the flight vehicle's systems do not compromise the airworthiness of the aircraft and cause it to disintegrate or crash into a populated area where it could cause property damage or loss of life. In a flight vehicle that carries batteries, especially current lithium-ion batteries, the batteries are a source of fire risk and it is desirable to put them as far away from the flight vehicle's critical structures so that these structures are not compromised by fire.

Figure 1A:
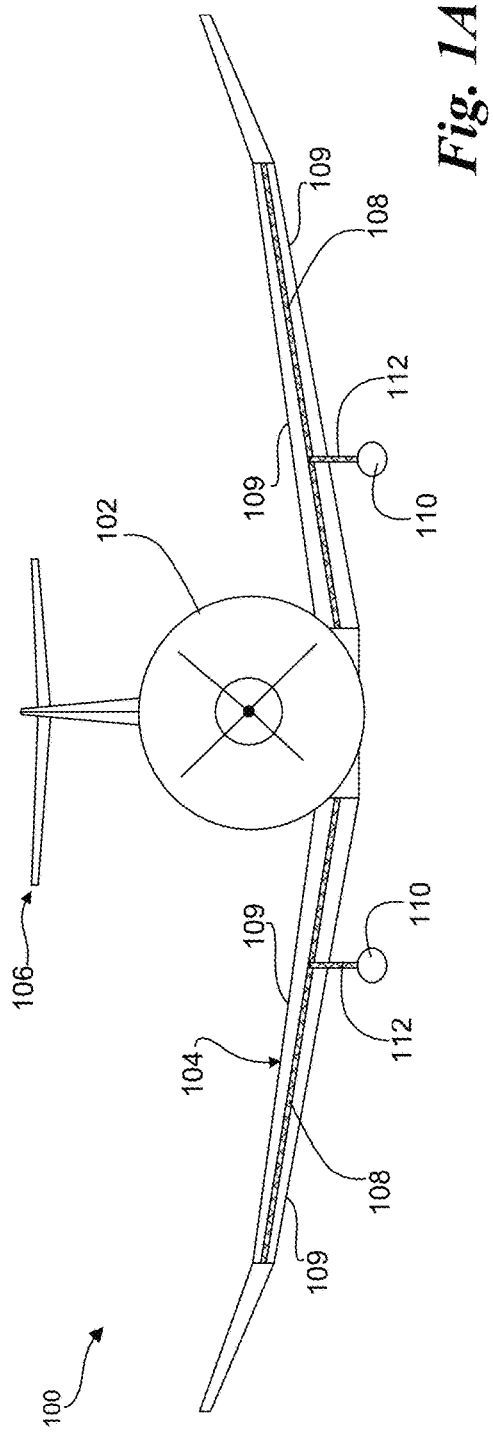
FIGS. 1A-1B are front-view diagrams of aircraft implementations.
Figure 1B:
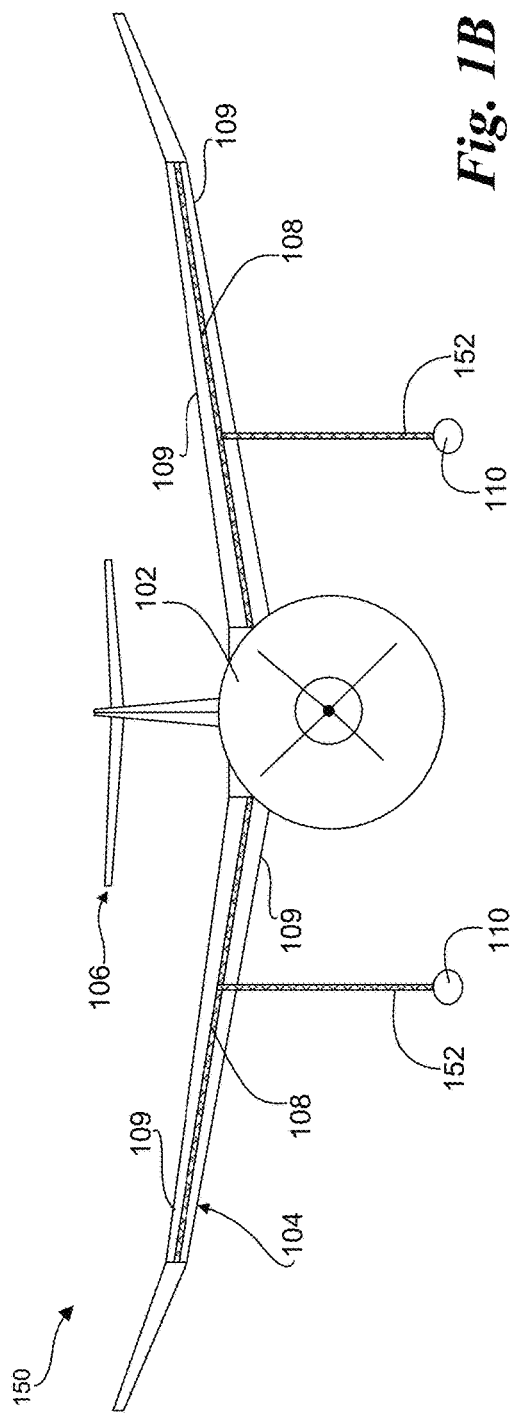

FIGS. 1A-1B illustrate implementations of a high-altitude, high-endurance aircraft. FIG. 1A illustrates an implementation of an aircraft 100 that includes a fuselage 102 structurally coupled to a wing 104 and a tail 106. Aircraft 100 is a low-wing aircraft, meaning that fuselage 102 sits on wing 104 or, put differently, wing 104 is positioned in the lower part of fuselage 102. Wing 104 includes a spanwise-running spar 108, which is one of its main structural members along with a chordwise-running ribs (not shown) and a wing skin 109.

Battery containment pods 110 are coupled to spar 108 by a pylons 112. Battery containment pods 110 allow aircraft 100 to safely carry batteries away from the main structural elements of aircraft 100, so that the batteries can safely store electrical power generated by other onboard systems such as solar panels on or in wing skin 109 and can provide power to one or more motors that drive propellers to propel the aircraft, as well as onboard systems such as navigation electronics, communication electronics, etc.

Additionally, in the illustrated implementations battery containment pods 110 are positioned below the lowest part of fuselage 102. Because their lowest surface is below the lowest part of fuselage 120, pods 110 form the lowest part of the aircraft and can also function as landing skids for aircraft 100, thus avoiding the need for heavy landing gear and increasing the aircraft's performance. But not every implementation of aircraft 100 need use battery containment pods as landing skids.

FIG. 1B illustrates another implementation of an aircraft 150. Aircraft 150 is similar in most respects to aircraft 100, except that aircraft 150 has a high-wing configuration, meaning that the wing is positioned in the top of fuselage 102 rather than the bottom or, put differently, that the fuselage hangs from the wing rather than being positioned above. As a result of the high-wing configuration, pylons 152 are longer than pylons 112, so that in aircraft 150 pods 110 can still be used as landing skids. But other implementations of aircraft 150 that do not use pods 110 as landing skids can have pylons 152 shorter than shown.

Figure 2:
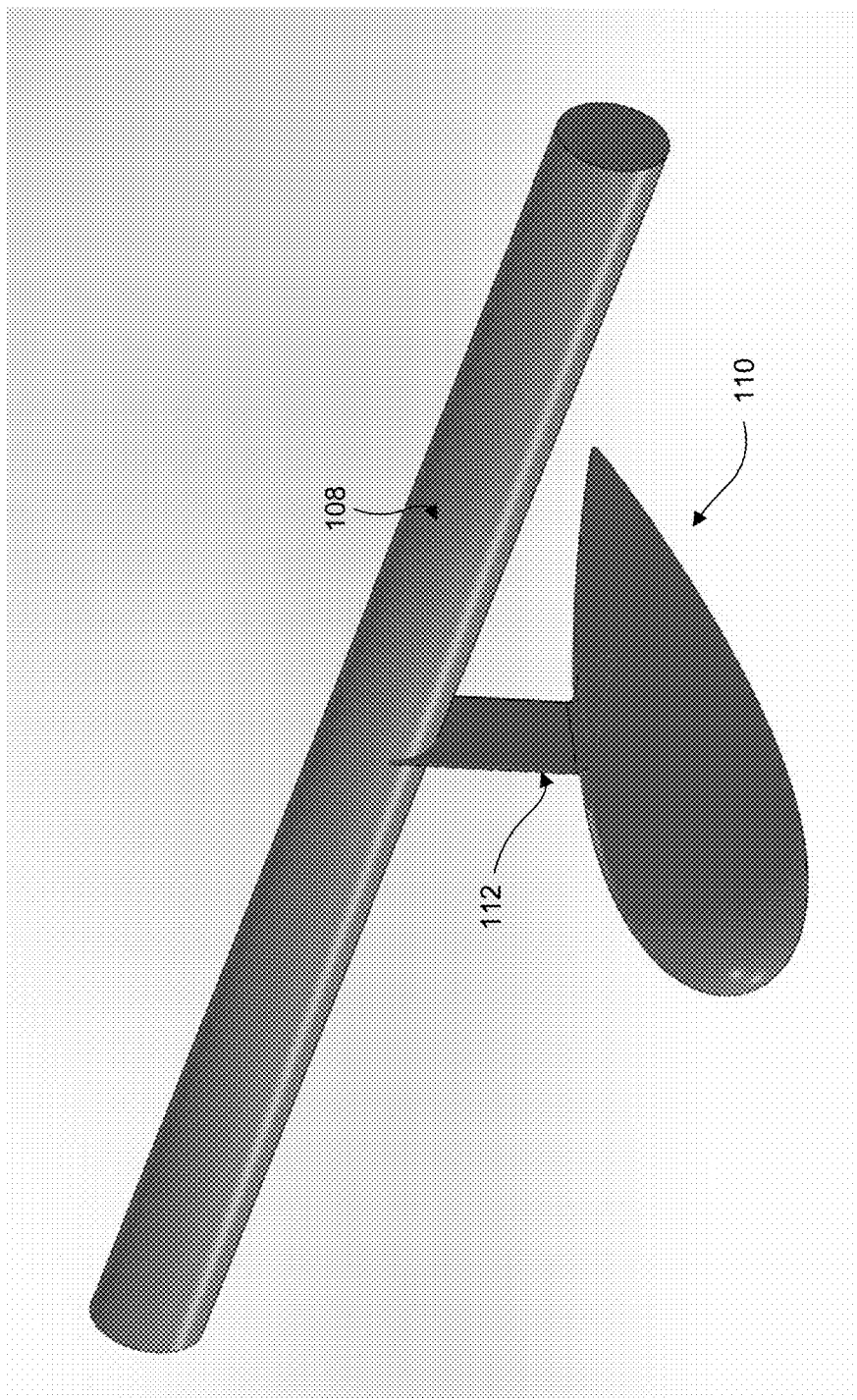
FIG. 2 is a perspective view of a battery containment pod.

FIG. 2 illustrates an implementation of a battery containment pod 110. Pod 110 is attached to an aerodynamically-shaped pylon 112, and pylon 112 is in turn attached to wing spar 108. In this arrangement, batteries within pod 110 are separated from spar 108 and other critical wing structures, so that a battery fire will not burn these structures.

In the illustrated implementation pod 102 can be axisymmetric with a cross-section corresponding to a symmetrical airfoil, such as a NACA 0023. In operation a pod with an axisymmetric shape generates substantially no lift when at zero angle of attack, although it could generate lift when at a non-zero angle of attack. But in other implementations pod 110 need not be axisymmetric and can be designed to lift upward (toward the wing) or downward (away from the wing) even at zero angle of attack. In the illustrated implementation pylon 112 has a cross-sectional shape corresponding to a symmetrical airfoil such as a NACA 0012, but in other implementations different symmetrical or non-symmetrical airfoil sections could be used.

Figure 3A:
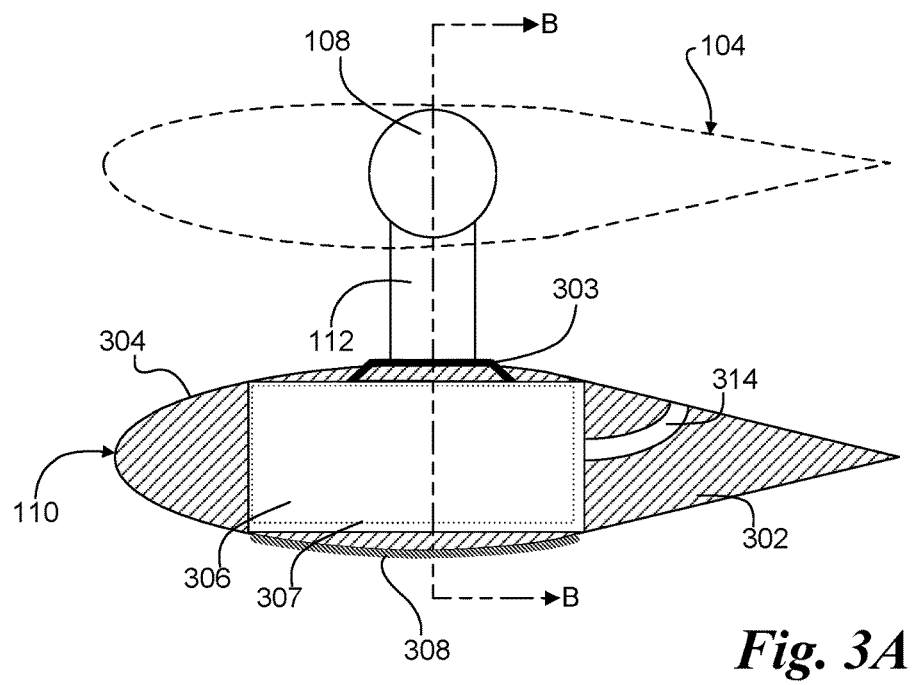
FIG. 3A is a diagrammatic side cross-section of an implementation of a battery containment pod.
Figure 3B:
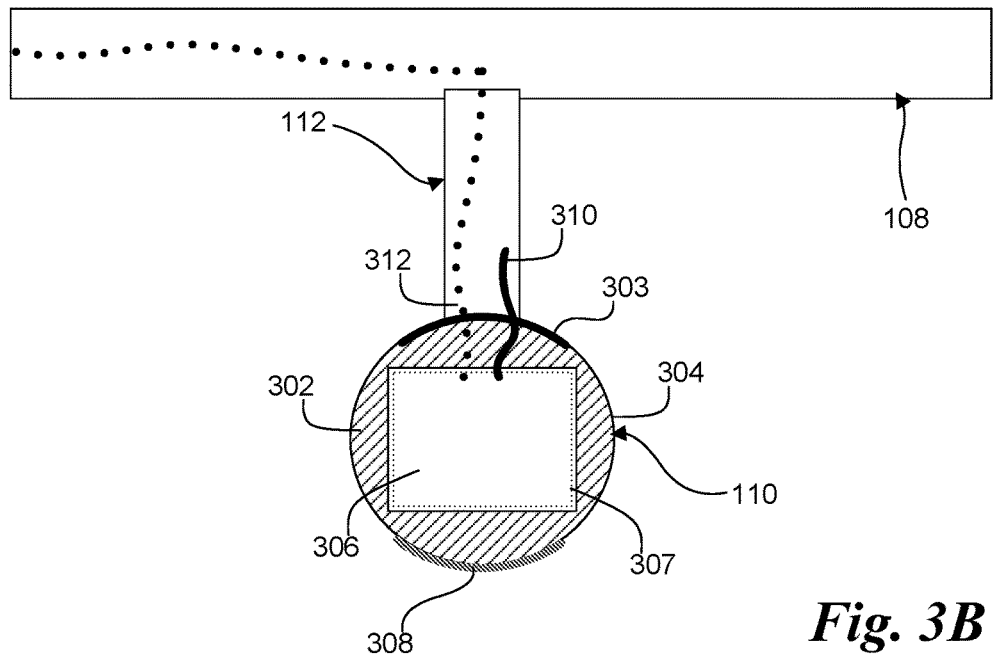
FIG. 3B is a diagrammatic front cross-section of the battery containment pod of FIG. 3A, taken substantially along section line B-B.

FIGS. 3A-3B together illustrate details of an implementation of pod 110 and pylon 112; FIG. 3A is a side cross-section, FIG. 3B a front cross-section. Pod 110 is a solid body made of a thermally insulating material 302 that can be easily formed; in one implementation material 302 can be extruded polystyrene (XPS), but other materials can be used. A cavity 306 is formed in material 302 to house batteries, electronics, and associated equipment. The interior of cavity 306 can be lined with materials 307, such as metal foils, aramid fiber materials such as Kevlar, or other materials, for further thermal insulation and fire protection. A channel 314 can be formed in material 302 so that components housed within cavity 306 can interact with exterior air outside pod 110 (see FIG. 4). A coating of a thin, smooth material covering 304 is put on the outside of pod 110 to protect the interior insulating material 302 and to give the pod a smooth and aerodynamic exterior surface. In one implementation material covering 304 can be a bi-axially oriented polyethylene terephthalate (BoPET) such as the material known under the trade name Mylar, but in other implementations other materials can be used.

In some implementations an abrasion-resistant material 308 can be layered onto exterior surface 304 on the bottom of pod 110 so that pylon 112 and pod 110 can function as a landing skid for the aircraft. In one implementation abrasion-resistant material 308 can be aramid fiber materials such as Kevlar, but other materials such as metals or plastics can be used. Abrasion-resistant material 308 can be removable and replaceable so that it can be easily removed and replaced when worn out.

All or part of pod 110 can include an "exoskeleton" 303 to provide hard points where pod 110 can be securely attached to pylon 112. In one implementation the frame or exoskeleton can be made of carbon fiber, but in other implementations metals, plastics, aramid fiber materials such as Kevlar, or other materials can be used.

In one implementation, pylon 112 can be a monocoque, semi-monocoque, or non-monocoque structure. Pylon 112 can be built with the appropriate length and cross-sectional shape using composite materials such as carbon fiber, aramid fiber materials such as Kevlar, metals, plastics, or other materials or combinations of materials. Pylon 112 is structurally coupled to spar 108. In one implementation, the end of pylon 112 that will be attached to spar 108 is shaped to match the shape of the spar and is then attached to the spar using adhesives such as toughened epoxy, although in other implementations a special fixture or fasteners can be used for this attachment. But in other implementations pylon 112 can be structurally coupled to spar 108 using fasteners or specially-designed fixtures adapted for the purpose.

Two or more cables can also couple pod 110 to pylon 112: an electrical cable 312 and a mechanical cable 310. Electrical cable 312 is electrically coupled to the batteries or electronics that are housed in cavity 306 and can be routed through pylon 112 and spar 108 to other components in the aircraft. Mechanical cable 310 couples the components housed within cavity 306, batteries in one implementation, to pylon 112 so that they will not fall away from the aircraft if a fire consumes all of pod 110.

Figure 4:
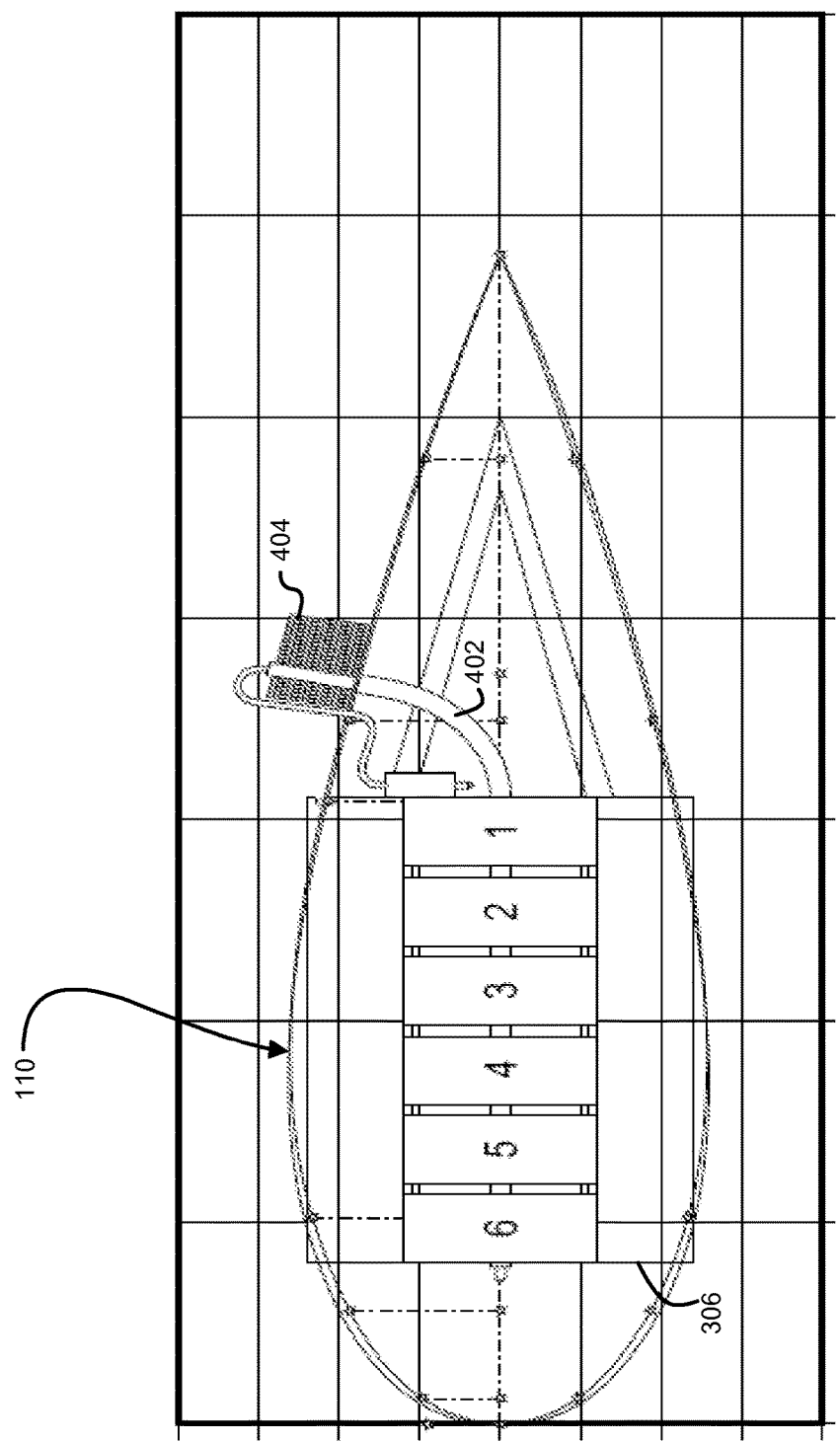
FIG. 4 is a cross-sectional view of an implementation of a battery containment pod.

FIG. 4 is a cross-section of pod 110. The pod has the cross-section shape of a symmetrical airfoil. Housed within cavity 306 are components such as battery cells 1-6, as well as heat-transfer pipe 402 positioned in channel 314 to conduct heat away from battery cells 1-6 and regulate their temperature. Heat transfer pipe 402 extends from cavity 306 to the outer surface of pod 110, where it is thermally coupled to a radiator 404 that can transfer heat into external air flowing over the pod. Additional or different components, such as electronics, battery protection devices, etc., can be co-housed in cavity 306 with the battery cells.

One important advantage of the described implementations is the spatial separation of the batteries from critical aircraft structure. This separation is a very weight-efficient way to protect critical aircraft structure from fire and allows more freedom in the design of other aspects of the battery such as environmental controls. Insulating material 302 reduces the thermal energy lost from the warm batteries also serves as the pod structure and aerodynamic fairing, resulting in very light weight. And, as described above, in some implementations the pods can also function as landing skids to stabilize the aircraft during landing, contributing to an even more weight-efficient design.

Locating the batteries outside critical aircraft structures also significantly reduces the weight of required fire protection materials. A battery containment structure inside the wing would have to directly withstand the heat and gases of burning batteries, but if the batteries are outside the structure almost all of the thermal energy from a fire will be directly dissipated into the airstream. The corrosive and dangerous gases are similarly directly vented. For an additional margin of safety, in some implementations a layer of metal foil can be mounted on the wing near the pod to reflect infrared energy and stop the occasional ember. There are numerous other benefits to external battery containment: pods are modular and can be easily replaced, access into the wing interior is no longer required, and there is no need for cutouts in the wing for any items that need access to the airstream—such as the battery cooling heat exchanger, for example.

The above description of illustrated implementations of the invention, including what is described in the abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. A battery containment pod comprising:
   a solid body having an aerodynamic exterior shape and an interior cavity formed within the solid body, the size and shape of the interior cavity designed to accommodate one or more battery packs, wherein the solid body comprises insulating material;

a smooth exterior coating covering the exterior shape of the solid body;

an attachment structure formed in or on the solid body to allow the solid body to be coupled to a flight vehicle by a pylon;

a mechanical safety cable to couple the one or more battery packs, when present, to the pylon;

an electrical cable extending from the interior cavity to at least the exterior surface to couple the battery packs, when present, to a corresponding electrical connector in the pylon; and a channel extending from the internal cavity through the insulating material forming the solid body and through the smooth exterior coating to an exterior of the battery containment pod for conducting heat to exterior air surrounding the battery containment pod.

2. The pod of claim 1 wherein the solid body is formed of extruded polystyrene.

3. The pod of claim 1 wherein the exterior coating is a bi-axially oriented polyethylene terephthalate.

4. The pod of claim 1, further comprising a thermally insulating fire-resistant material lining the interior cavity.

5. The pod of claim 1 wherein the aerodynamic exterior shape is axisymmetric.

6. The pod of claim 5 wherein the cross-sectional shape of the axisymmetric exterior shape is a NACA 0023 airfoil.

7. The pod of claim 1 wherein the exterior shape of the solid body is such that the pod generates no lift.

8. The pod of claim 1 wherein the pylon is coupled to the attachment structure for coupling the pod to a wing spar of the flight vehicle.

9. The pod of claim 1, further comprising a strip of abrasion-resistant material positioned on the exterior coating on a lower part of the pod.

10. The pod of claim 9 wherein the abrasion-resistant material is a metal or an aramid fiber material.

11. The pod of claim 1, further comprising a heat pipe positioned in the channel and extending from the internal cavity to the exterior of the pod.

12. A flight vehicle comprising:
a fuselage;
a wing including a spar structurally coupled to the fuselage;
a pylon coupled to the spar;
a battery containment pod, the battery containment pod including:
a solid body having an aerodynamic exterior shape and an interior cavity formed within the solid body, the size and shape of the interior cavity designed to accommodate one or more battery packs, wherein the solid body comprises insulating material;

a smooth exterior coating covering the exterior shape of the solid body;

an attachment structure formed in or on the solid body and coupled to the pylon;

a mechanical safety cable to couple the one or more battery packs, when present, to the pylon;

an electrical cable extending from the interior cavity to at least the exterior surface to couple the battery packs, when present, to a corresponding electrical connector in the pylon; and a channel extending from the internal cavity through the insulating material forming the solid body and through the smooth exterior coating to an exterior of the battery containment pod for conducting heat to exterior air surrounding the battery containment pod.

13. The flight vehicle of claim 12 wherein the solid body is formed of extruded polystyrene.

14. The flight vehicle of claim 12 wherein the exterior coating is a bi-axially oriented polyethylene terephthalate.

15. The flight vehicle of claim 12, further comprising a thermally insulating fire-resistant material lining the interior cavity.

16. The flight vehicle of claim 12 wherein the aerodynamic exterior shape is axisymmetric.

17. The flight vehicle of claim 16 wherein the cross-sectional shape of the axisymmetric exterior shape is a NACA 0023 airfoil.

18. The flight vehicle of claim 12 wherein the exterior shape of the solid body is such that the pod generates no lift at zero angle of attack.

19. The flight vehicle of claim 12, further comprising a strip of abrasion-resistant material positioned on the exterior coating on a lower part of the pod.

20. The flight vehicle of claim 19 wherein the abrasion-resistant material is a metal or an aramid fiber material.

21. The flight vehicle of claim 12, further comprising a heat pipe positioned in the channel and extending from the internal cavity to the exterior of the pod.

22. The pod of claim 9 wherein the presence of the abrasion-resistant material transforms the pod into a landing gear for the flight vehicle.

23. The flight vehicle of claim 19 wherein the presence of the abrasion-resistant material transforms the pod into a landing gear for the flight vehicle.

* * * * *